United States Patent
Peever (10) Patent No.: US 9,770,672 B2
(45) Date of Patent: Sep. 26, 2017

(54) DEWATERING METHOD USING A WICKING MATERIAL

(76) Inventor: Brian J. Peever, Regina (CA)

( * ) Notice: Subject to any disclaimer, the term of this patent is extended or adjusted under 35 U.S.C. 154(b) by 578 days.

(21) Appl. No.: 14/240,244

(22) PCT Filed: Aug. 21, 2012

(86) PCT No.: PCT/CA2012/050573
§ 371 (c)(1),
(2), (4) Date: Feb. 21, 2014

(87) PCT Pub. No.: WO2013/026160
PCT Pub. Date: Feb. 28, 2013

(65) Prior Publication Data
US 2014/0209450 A1    Jul. 31, 2014

Related U.S. Application Data

(60) Provisional application No. 61/525,927, filed on Aug. 22, 2011.

(51) Int. Cl.
*C02F 1/04* (2006.01)
*B01D 1/22* (2006.01)
(Continued)

(52) U.S. Cl.
CPC ............. *B01D 1/22* (2013.01); *B01D 1/0035* (2013.01); *B01D 1/0064* (2013.01); *B01D 5/006* (2013.01);
(Continued)

(58) Field of Classification Search
CPC . C02F 1/04; C02F 1/14; B01D 1/0035; B01D 1/0064; B01D 1/22; B01D 5/006; F26B 5/00; F26B 5/16; F26B 9/00
See application file for complete search history.

(56) References Cited

U.S. PATENT DOCUMENTS 2,445,350 A    7/1948  Ginnings
2,807,912 A  * 10/1957  Bjorksten ............. A01G 9/247
                                                        159/903
(Continued)

FOREIGN PATENT DOCUMENTS

FR         2846571      5/2004
GB         2398369      8/2004
WO       2005070512    8/2005

OTHER PUBLICATIONS

EPO translation of FR 2846571 obtained Jun. 13, 2016.*

*Primary Examiner* — Jonathan Miller
(74) *Attorney, Agent, or Firm* — Ryan W. Dupuis; Kyle R. Satterthwaite; Ade & Company Inc.

(57) ABSTRACT

A wet material having at least a liquid portion is dewatered by providing one or more wicking members of wicking material arranged to transfer moisture passively by wicking therethrough from a contacting portion in contact with the wet material to an evaporating portion where the transferred liquid portion is arranged to be evaporated. In some embodiments conductive elements are included in the wicking member to assist in distributing heat across the wicking member which enhances the evaporation of moisture transferred therethrough from the wet material. In yet further embodiments, a condenser member is provided in proximity to the evaporating portion of the wicking member so as to be arranged to condense and collect at least some of the liquid portion evaporated from the wicking member.

27 Claims, 6 Drawing Sheets

(51) Int. Cl.
*F26B 9/00* (2006.01)
*B01D 1/00* (2006.01)
*C02F 1/14* (2006.01)
*F26B 5/16* (2006.01)
*B01D 5/00* (2006.01)
*E02B 11/00* (2006.01)

(52) U.S. Cl.
CPC ................ *C02F 1/04* (2013.01); *C02F 1/14* (2013.01); *E02B 11/00* (2013.01); *F26B 5/16* (2013.01); *F26B 9/00* (2013.01)

(56) References Cited

U.S. PATENT DOCUMENTS

| | | | | |
|---|---|---|---|---|
| 3,159,554 | A * | 12/1964 | Mount | C02F 1/14 |
| | | | | 126/634 |
| 3,501,381 | A * | 3/1970 | Delano | B01D 1/0005 |
| | | | | 159/904 |
| 4,585,523 | A * | 4/1986 | Giddings | B01D 1/22 |
| | | | | 159/13.1 |
| 6,663,750 | B1 * | 12/2003 | Coon | B01D 1/0005 |
| | | | | 126/600 |
| 7,166,188 | B2 | 1/2007 | Kedem | |
| 7,815,776 | B2 * | 10/2010 | Wilson | B01D 1/0076 |
| | | | | 159/24.1 |
| 8,906,203 | B2 * | 12/2014 | Ugolin | B01D 1/16 |
| | | | | 203/10 |
| 2008/0066874 | A1 * | 3/2008 | Bhatti | B01D 1/14 |
| | | | | 159/5 |

* cited by examiner

DEWATERING METHOD USING A WICKING MATERIAL

This application claims priority benefit to U.S. provisional application Ser. No. 61/525,927, filed Aug. 22, 2012.

FIELD OF THE INVENTION

The present invention relates to a wicking member comprising wicking material for separating a liquid portion from a wetted material, for example when dewatering a sludge material, and more particularly the present invention relates to a wicking member including wicking material for transferring moisture by capillary action therethrough which may further incorporate a conductive material for transferring heat across the wicking material to assist in evaporation of the moisture transferred by capillary action through the wicking material.

BACKGROUND

There are various instances where a simple reliable and low cost method of dewatering is desirable. Examples include dewatering sludge, drying flooded ground, and extraction of salt from salt solutions, mineral and material collection.

U.S. Pat. No. 3,613,564 by General American Transportation Corporation discloses a sludge dewatering apparatus using a wicking material. The device however requires a complex belt and surrounding structure with considerable power input to dry the process.

Wicking materials have also been used effectively in other applications, such as clothing where it is used as an inner layer with outer layers of other material for wicking moisture away from the body to the outer layers. U.S. Pat. No. 7,721,349 by Strauss and U.S. Pat. No. 6,855,410 by Buckley are two examples of complex materials for clothing, however there are no suggested modifications or apparent benefits in applying wicking material to other applications.

Other beneficial materials are described in U.S. Pat. No. 5,227,230, however in this instance the fabric material is used as an insulator, not for wicking. A metallic surface is used only for heat retention.

Use of sheeted material for assisting evaporation from a wet source by increasing the surface area of the source is described in U.S. Pat. No. 7,166,188 by Kedem et al and also in a published article entitled *WAIV—wind aided intensified evaporation for reduction of desalination brine volume* by J. Gilron, Y. Folkman, R. Savliev, M. Waisman, and O. Kedem, *Desalination* 158 (2003), pp. 205-214, Elsevier Science B.V. The proposed evaporation method requires the use of complex structure to pump the liquid to an overhead tank where the sheeted material is wetted so that gravity assists in transferring the liquid downwardly across the surfaces of the sheeted material. The structure is unsuitable for use across an existing settling pond and is inefficient due to the pumping requirements.

SUMMARY OF THE INVENTION

According to one aspect of the present invention there is provided a method of dewatering a wetted material comprising at least a liquid portion, the method comprising:

providing a wicking member comprising a wicking material having wicking properties so as to be arranged to transfer moisture passively by wicking therethrough from a contacting portion to an evaporating portion;

positioning the wicking member with the contacting portion in contact with the wetted material and the evaporating portion above the contacting portion such that:

the liquid portion is arranged to be transferred from the wetted material primarily by wicking upwardly through the wicking member; and the transferred liquid portion is arranged to be evaporated from the evaporating portion.

The wicking member according to the present invention is arranged for passively wicking moisture, for example by capillary action, to transfer moisture away from a wet material in a simple and low cost dewatering application. The wetted material can be pure water with or without any other substance or combination of substances including; chemicals, biological components, minerals, solids, soils. The primary purpose for wicking the moisture from the wetted material across the wicking material is to increase the surface area of the water exposed to the atmosphere which in turn increases the evaporation rate. The possible addition of conductive elements also allows heat to be passively transferred to the wicking member to encourage evaporation of moisture transferred through the wicking member to enhance the dewatering process. The wicking member and method of use as described herein involves minimal or substantially no power input such that the dewatering process is optimally efficient at removing moisture from a wet material containing solids and liquids. By further communicating a bottom end of the wicking material with the wetted material so that the moisture is primarily wicked upwardly through the wicking material, the wicking member is well suited to be supported over an existing settling pond for example.

In some embodiments the contacting portion of the wicking member is penetrated downwardly into the wetted material while the evaporating portion of the wicking member protrudes substantially vertically upward from the wetted material. The evaporating portion of the wicking member may be further positioned to extend upwardly from the contacting portion to an upper free end of the wicking member.

In the illustrated embodiments attached herewith the liquid portion is transferred from the wetted material solely by passive wicking upwardly through the wicking member, primarily by passive capillary action.

The wicking member may comprise a textile.

In some instances a prescribed batch of wetted material is dewatered by supporting the wicking member in a substantially fixed relationship with the wetted material.

Alternatively, a continuous flow of wetted material in a conduit may be dewatered by supporting at least a portion of the wicking member in the conduit.

The wicking member may be positioned to extend horizontally across wetted material between two opposing ends of the wicking member which are connected to a support frame.

In some embodiments, the wicking member comprises conductive elements integrally supported on the wicking material so as to be arranged to transfer heat across the wicking member.

When the wicking member comprises a textile, the conductive elements of the wicking member may be woven into the textile.

The conductive elements may form a support structure which integrally supports the wicking material thereon.

Preferably at least a portion of the conductive elements are exposed to solar rays to provide heat to be conducted across the wicking member to enhance evaporation therefrom.

Alternatively an electrical current source may be connected to the conductive elements such that the conductive elements are heated by an electrical current from the electrical current source.

In some applications the wicking member is supported to extend across an upper surface of a containment pond of the wetted material such that the wicking material is in direct contact with wetted material in the containment pond. In this instance, the wetted material may comprise a salt solution for example.

In another application, the wetted material comprises flooded ground and the method includes laying the wicking member across a surface of the ground.

There may be provided a source of waste heat arranged to heat the wicking material, for example by being connected in a heat exchanging relationship with the conductive elements.

There may further be provided a mechanical aeration device arranged to increase airflow across the wicking member.

In yet further embodiments there may be provided a condenser enclosure about the evaporating portion of the wicking member which is arranged to condense and collect the liquid portion evaporated from the wicking member.

According to a second aspect of the present invention there is provided a method of dewatering a wetted material comprising at least a liquid portion, the method comprising:
providing a wicking member comprising a wicking material having wicking properties so as to be arranged to transfer moisture passively by wicking therethrough from a contacting portion to an evaporating portion;
positioning the wicking member with the contacting portion in contact with the wetted material such that the liquid portion is arranged to be transferred from the wetted material by wicking through the wicking member to the evaporating portion for evaporation therefrom; and
providing a condenser enclosure about the evaporating portion of the wicking member which is arranged to condense and collect the liquid portion evaporated from the wicking member.

The condenser enclosure may comprise a transparent member permitting solar rays to be transmitted therethrough to the evaporating portion of the wicking member.

There may also be provided a first containment area receiving the wetted material therein and a second containment area in communication with the first containment area such that the wetted material is only permitted to flow from the first containment area to the second containment area. In this instance the contacting portion is positioned in contact with the second containment area and the liquid portion collected by the condenser enclosure is returned to the first containment area.

According to another aspect of the present invention there is provided a method of dewatering a wetted material comprising at least a liquid portion, the method comprising:
providing a plurality of wicking members of like configuration, each comprising a panel of wicking material having wicking properties so as to be arranged to transfer moisture passively by wicking therethrough from a contacting portion to an evaporating portion;
supporting the panels at spaced apart positions from one another in respective upright orientations such that each panel extends upwardly from the respective contacting portion in contact with the wetted material to the evaporating portion above the wetted material such that the liquid portion is arranged to be transferred from the wetted material by wicking through the wicking member to the evaporating portion for evaporation therefrom;
providing at least one condenser member comprising at least one surface upon which the liquid portion evaporated from the wicking members is arranged to be condensed;
supporting said at least one condenser member at an intermediate location between respective ones of the wicking members; and
collecting the condensate which is condensed on said at least one condenser member.

The method may further include cooling said at least one surface of said at least one condenser member by communicating heat from said at least one condenser member to the wetted material or to an external cooling device.

According to a further aspect of the present invention there is provided a wicking member for dewatering a wetted material comprising a solids portion and a liquid portion, the wicking member comprising:
a wicking material having wicking properties so as to be arranged to transfer moisture through the wicking member by capillary action; and
a plurality of conductive elements integrally supported on the wicking material so as to be arranged to conduct heat across the wicking material.

The conductive elements may be applied to at least a first side of the wicking material such that portions of the wicking material between adjacent conductive elements remain exposed at the first side.

Various embodiments of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures there is illustrated a wicking member generally indicated by reference numeral 10. The wicking member 10 is particularly suited for separating a liquid portion from a remaining portion in a wetted material 12 in either batch treatment or continuous flow processes. The wicking member also increases the surface area of the exposed liquid to increase the rate of evaporation. Examples of wetted materials include various forms of sludge, such as municipal or industrial sludge to be dewatered, flooded ground, or salt solutions from which it is desirable to extract salt or fresh water therefrom in which the liquid portion may be alone or in combination with solids, chemical, biological or any materials.

Although various embodiments of the wicking member are described in the following and accompanying drawings, the common features will first be described herein.

The wicking member 10 primarily comprises a wicking material 14 such as a synthetic fibre which is woven into a textile. The resulting textile has wicking properties so as to be arranged to transfer moisture by various wicking forces, for example passive capillary action, from a first contacting portion or contact area 16 in contact with the wetted material to a second evaporating portion defining an exposed area 18 from which the transferred moisture surface area is increased to enhance evaporation into the surrounding environment.

In some instances, one side of the wicking member may be in contact with an exposed surface of the wetted material or alternatively the contact area may be defined as a penetrating portion of the wicking material which is penetrated into or submerged into the wetted material.

Similarly, the exposed area may simply comprise one side of the wicking material directly opposite the contact area or alternatively the exposed area may comprise a protruding portion of the wicking material which protrudes outwardly from the wetted material.

In some embodiments, a plurality of conductive elements 20 are integrally supported on the wicking material of the wicking member. The conductive elements are formed of a suitable conductive material, typically arranged in a grid pattern or mesh arrangement such that all of the conductive elements are interconnected or continuous with one another. The elements may be woven, integrated into the textile, or in contact with the textile but are typically supported in a manner such that at least a portion of the conductive elements remain exposed at a surface of the wicking member in the exposed area of the wicking member if passively heating the conductive elements with solar rays.

Alternatively, the conductive elements may form a substantially rigid framework or support structure which supports the wicking material in a desired shape.

In further arrangements, the conductive elements may be connected to an external electrical current source in which the electrical resistance of the conductive elements is arranged such that the conductive elements are heated when a current has passed therethrough. In either instance, the conductive elements serve to transfer heat substantially evenly across the wicking member to enhance the evaporation of moisture from the exposed area of the wicking member.

To further enhance the evaporation of moisture from the exposed area of the wicking member, the airflow across the wicking material with or without the addition of heat can be increased to increase the rate evaporation. Waste heat can also be used as a heat source to be transferred and distributed across the wicking material by the conductive elements.

Figure 1:
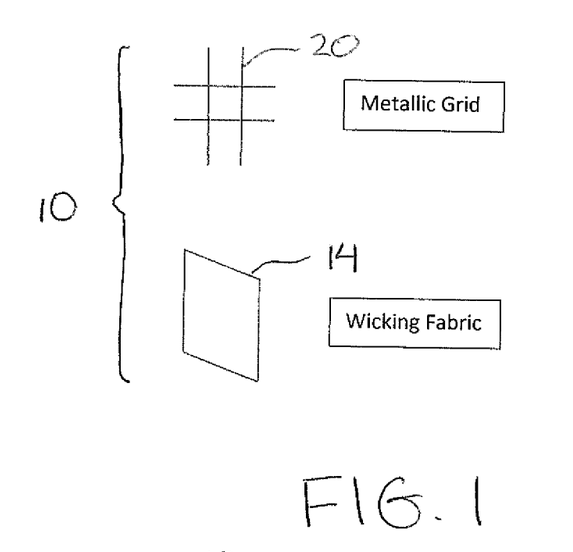
FIG. 1 is an exploded schematic representation of the wicking member.

Turning now more particularly to the embodiment of FIG. 1, the wicking material in this instance comprises a flexible sheet which is generally flat. When the material is a flat sheet it can be laid over or across a surface of the wetted material like a flat blanket. This is well suited for dewatering flooded ground.

As further shown in the embodiment of FIG. 1, the member comprises the conductive elements 20 which may be arranged to span the upper surface of the wicking material such that both the upper surface of the wicking material and the optional conductive elements are exposed to solar rays. The wicking material is fully exposed on the opposing bottom side of the wicking member in contact with the moisture in the ground. In this instance, the bottom side defines the contacting portion of the wicking member in contact with the wetted material while the upper side defines the evaporation portion. The moisture collected at the bottom side is transferred upwardly through the wicking member by various wicking forces.

Figure 2:
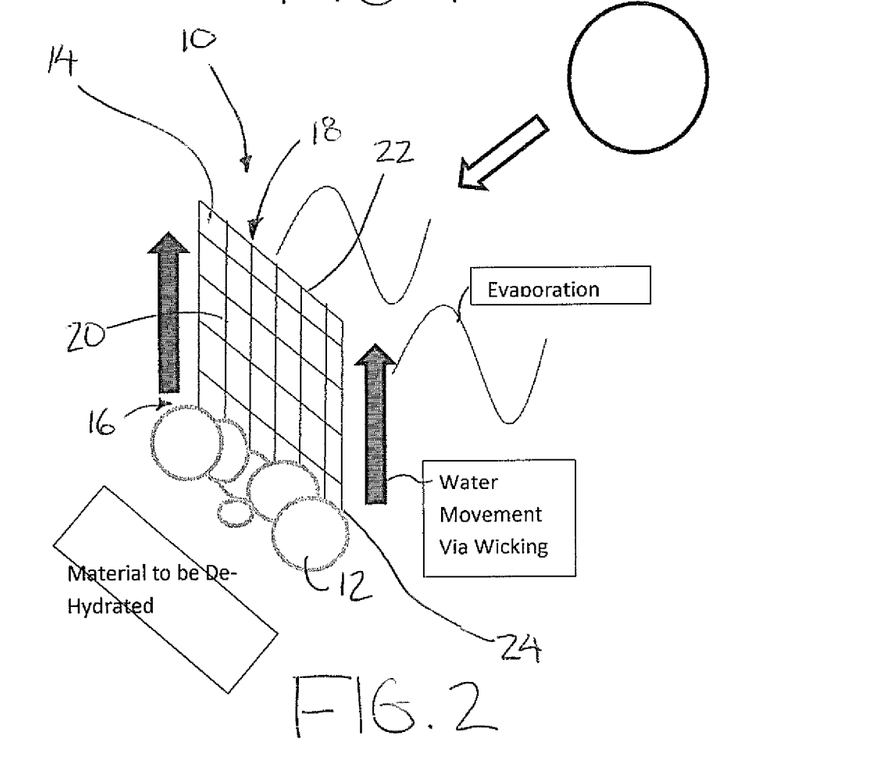
FIG. 2 is a schematic representation of a first embodiment of the wicking member.

Turning now to FIG. 2, according to a second embodiment, the wicking members are arranged in upright panels in which a lower portion defines a penetrating portion 24 of the wicking member penetrated down into the wetted material while the upper portion of the panel defines the protruding portion 22 extending upwardly and outwardly from the wetted material. In this instance, both sides of the wicking member at the penetrating portion are in contact with the wetted material while both sides of the wicking member at the protruding portion are exposed to permit evaporation of moisture therefrom. The wicking material in this instance is arranged to transfer moisture from the penetrating portion to the protruding portion by upward wicking forces where the transferred moisture can be evaporated from the wicking member. The conductive elements may fully span the wicking member such that the conductive elements in the protruding portion can be exposed to solar rays for transferring heat throughout the wicking member including the penetrating portion.

Figure 3:
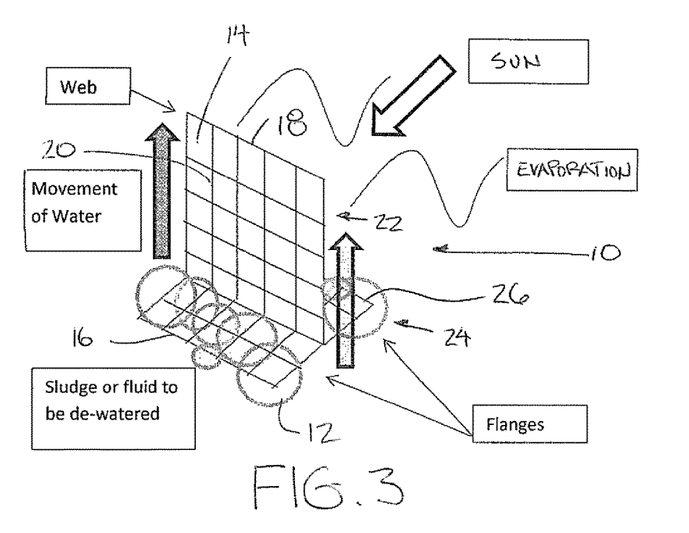
FIG. 3 is a perspective view of a second embodiment of the wicking member.

Turning now to FIG. 3, the wicking member in this instance includes a main body portion defining the penetrating portion and the protruding portion as described above in the previous embodiment. In this instance, the penetrating portion is also provided with a plurality of flanges 26 extending transversely to the main body portion at the penetrating portion 24 submerged in the wetted material. The flanges 26 extend outwardly from the main body portion into the wetted material to increase the surface area of the wicking material in contact with the wetted material.

Figures 4, 5:
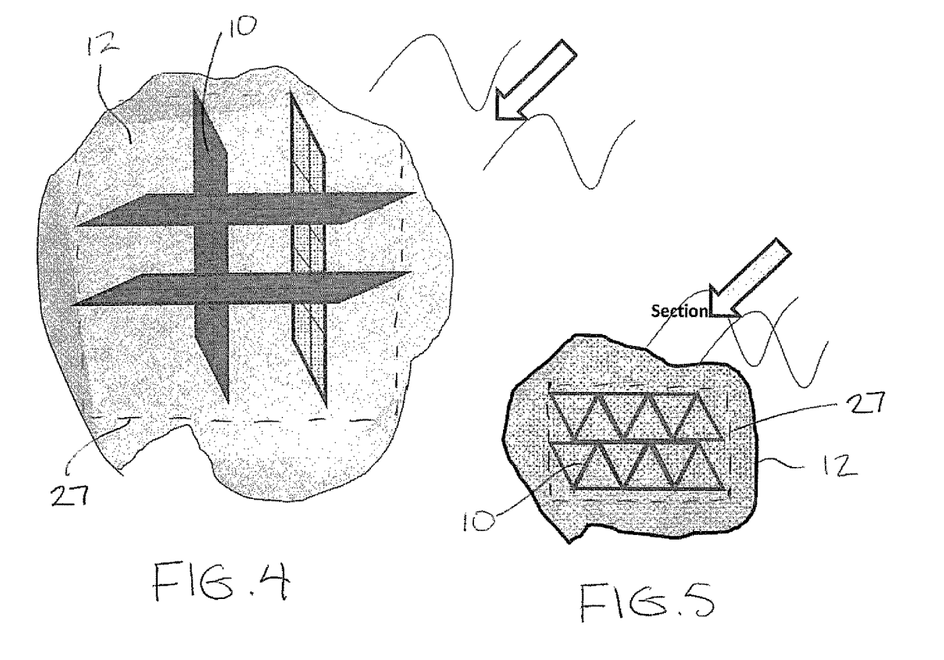
FIG. 4 and FIG. 5 are schematic representations of different wicking member patterns suited for use in a batch treatment and flooded areas.

Turning now to the embodiment of FIG. 4, the wicking member may comprise an interconnected grid of panels penetrated into the wetted material to yet further increase the surface area of the wicking material in contact with the wetted material. As shown in FIG. 4, the panels may be arranged in a grid pattern comprising a plurality of first panels oriented parallel and spaced apart from one another within the wetted material and a plurality of second panels extending parallel and spaced apart from one another transversely or perpendicularly to the first panels so as to be interconnected between adjacent ones of the first panels to define a generally rectangular grid structure. In a preferred arrangement the first and second panels are vertically oriented and perpendicular to one another such that each panels extends upwardly from a bottom end penetrated into the wetted material to a top free end spaced above the wetted material. Each panel spans across the wetted material between two opposed ends supported on a perimeter support frame 27. The support frame 27 is suitably arranged to be supported in situ at a containment pond for example to support the wicking member panels extending across the pond.

As shown in FIG. 5, an alternate grid pattern may comprise panels of wicking material defining triangular channels receiving the wetted material therethrough. Other shapes may also be used while still taking advantage of a grid structure to increase the contact area of the wicking material with the wetted material. The perimeter support frame 27 similarly supports the wicking member panels in the embodiment of FIG. 5.

The wicking material together with the optional conductive elements supported thereon may be supported on a rigid or flexible frame structure in the embodiments of FIGS. 4 and 5 to permit the grid structure to be inserted into a batch treatment of wetted material in which the top free end of the grid remains exposed such that the wicking material transfers moisture upwardly by wicking from the penetrating portion to the protruding portion as described above.

Turning now to FIGS. 6 through 9, the wicking member may also be arranged to form a conduit 28 receiving wetted material to be dehydrated in a continuous flow therethrough. Typically, in this instance a rigid mesh layer 30 spans an inner surface of the wicking member at the penetrating portion 24 or contact areas thereof such that portions of the wicking material remain exposed through the openings of the rigid mesh layer 30 and such that the layer serves to protect the wicking material of the wicking member from forces of the flowing fluid or semi-fluid wetted material through the conduit without interfering with the contact of the wicking material with the moisture to remove the moisture from the wetted material.

Figure 6:
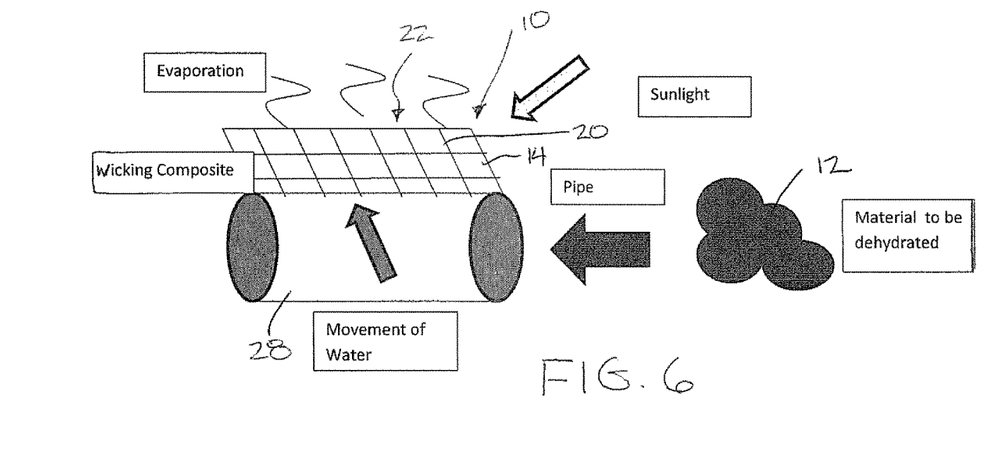
FIG. 6 is a perspective view of a first embodiment of a continuous flow wicking member.
Figure 7:
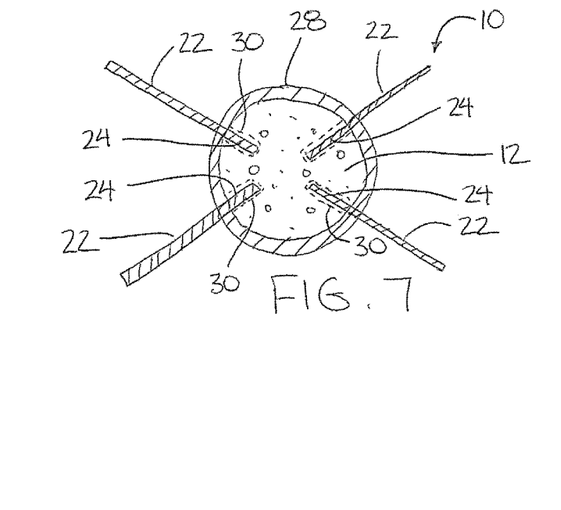
FIG. 7 is an end elevational view of the conduit of FIG. 6.

Turning now more particularly to the embodiment of FIGS. 6 and 7, the conduit in this arrangement comprises an enclosed pipe receiving the flow of material to be dehydrated therethrough. Typically the full cross sectional area of the pipe is filled with the material to be dehydrated as it flows through the pipe. The wicking member is this instance is arranged to extend through the wall of the pipe at one or at a plurality of circumferentially spaced positions such that a portion of the wicking member penetrating into the pipe defines the penetrating portion 24 submerged into the wet material while the remaining portion of the wicking member extends outwardly beyond the periphery of the pipe to define the protruding portion 22 from which the transferred moisture is evaporated. Exposing the protruding portion to solar rays and air enhances the evaporation while the conductive elements assists in evenly transferring the heat across the wicking member to enhance the transfer of moisture and evaporation of moisture from the wicking member.

Figure 8:
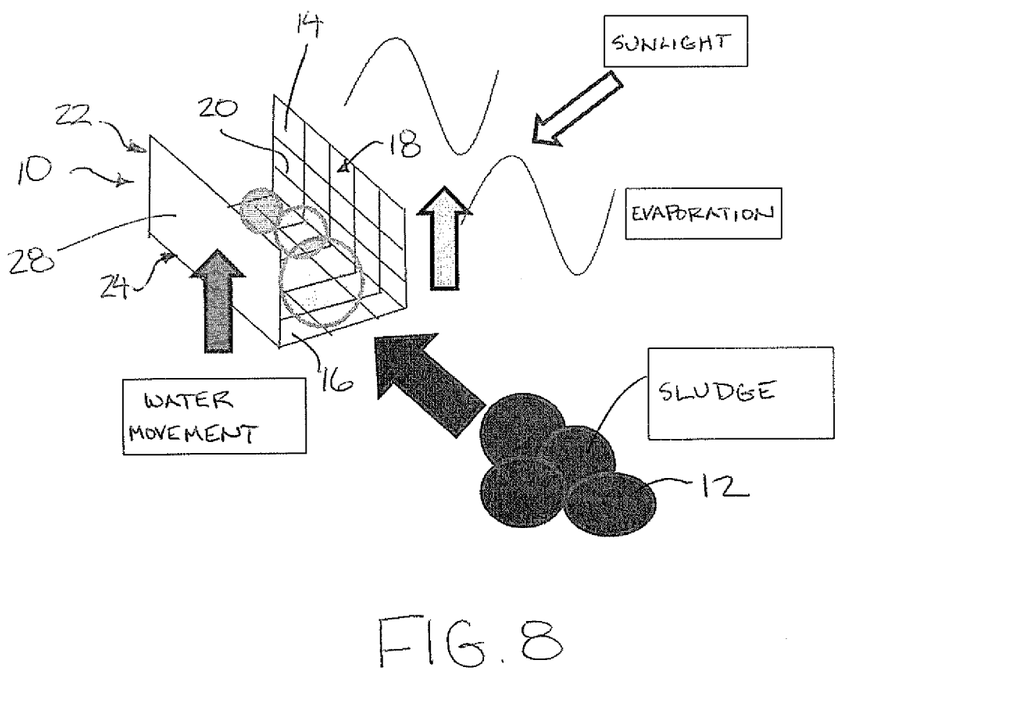
FIG. 8 is a perspective view of a second embodiment of a conduit incorporating the wicking member in a continuous flow.

As shown in FIG. 8, the conduit may also comprise a trough in which the wicking member lines the inner surfaces of the conduit. The flow of wetted material through the conduit may only fill the lower portion of the conduit in this instance such that the upper portion of the conduit defines the protruding portions of the wicking member exposed to air and solar rays and from which moisture can be evaporated. The sludge or any other fluid or semi-fluid is pushed through the channel where the liquid portion is wicked up the sides from the wicking material at the bottom wall to the open top. Additional flanges of wicking material may extend upward from the bottom wall or inwardly from the side walls to increase the surface area in contact with the wetted material.

Figure 9:
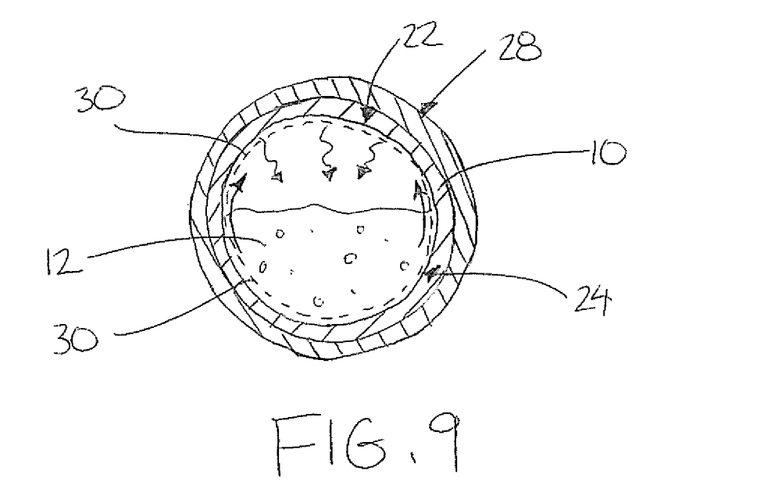
FIG. 9 is an end elevational view of a third embodiment of the conduit incorporating the wicking member therein.

Turning now to the embodiment of FIG. 9, the conduit may also comprise an enclosed pipe, however, in this instance the wicking member lines the inner surface of the pipe with the flow of wetted material only partially filling the pipe such that the remaining cross sectional area of the pipe not occupied by the wetted material can receive an air flow for defining the exposed area 22 of the wicking member from which moisture can be removed by evaporation.

In preferred embodiments, the wicking material will be permeable to air flow to increase evaporation rates therefrom. Also, an air circulating device may be used to increase the rate of evaporation. For example a mechanical aeration device may be arranged to increase airflow across or through the wicking member.

Also, the wicking material and the conductive elements would typically be of a suitable colour and finish that absorbs solar radiation, for example a non-reflective black finish.

Depending upon the application, the wicking material can be used for wicking both vertically and horizontally to increase the surface area of the exposed moisture.

In some instances, if the wicking material becomes covered in the contaminants left by the evaporation, it can be inverted as a method of cleaning. Doing so allows the area covered with contaminants to be submerged, passively cleaning it, while operation continues.

Figure 10:
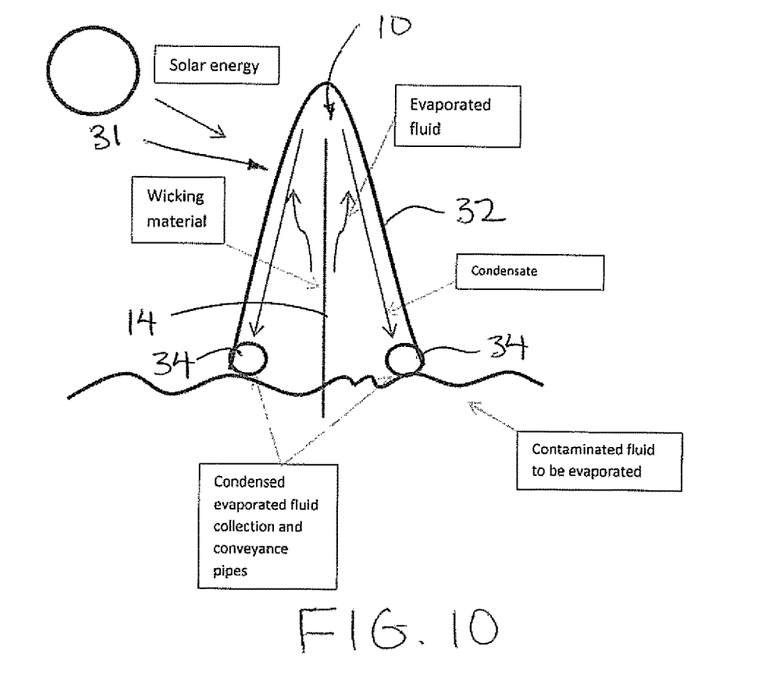
FIG. 10 is an end elevational view of a further embodiment of the wicking member including a condenser enclosure for collecting the liquid portion evaporated from the wicking member.

Turning now to the embodiment of FIG. 10, the wicking member in this instance cooperates with a condenser enclosure 31 which surrounds the evaporating or protruding portion of the wicking member so as to be arranged to condense and collect the liquid portion of the wetted material which is evaporated from the wicking member. The enclosure 31 is defined by a transparent cover member spanning over the wicking member. The cover member 32 is raised above the wicking member at a central apex and extends downwardly at an inclination along two opposing sides of the wicking member panel from the apex towards a perimeter edge of the cover member adjacent to the upper surface of the wetted material. The cover member is transparent to allow solar rays to pass therethrough for heating the wicking member panel to assist evaporation. The evaporated moisture condenses on the inner surface of the cover member and drips downwardly along the inner surface to the perimeter edge. A collection trough 34 is connected along the bottom edges of the cover member 32 so as to be arranged to collect the condensate from the cover member. Collection of the evaporated liquid, by condensing it on a transparent cover operates similarly to a how a solar still operates. The collected condensed fluid could then be conveyed to a common collection point and used for various purposes.

Figure 11:
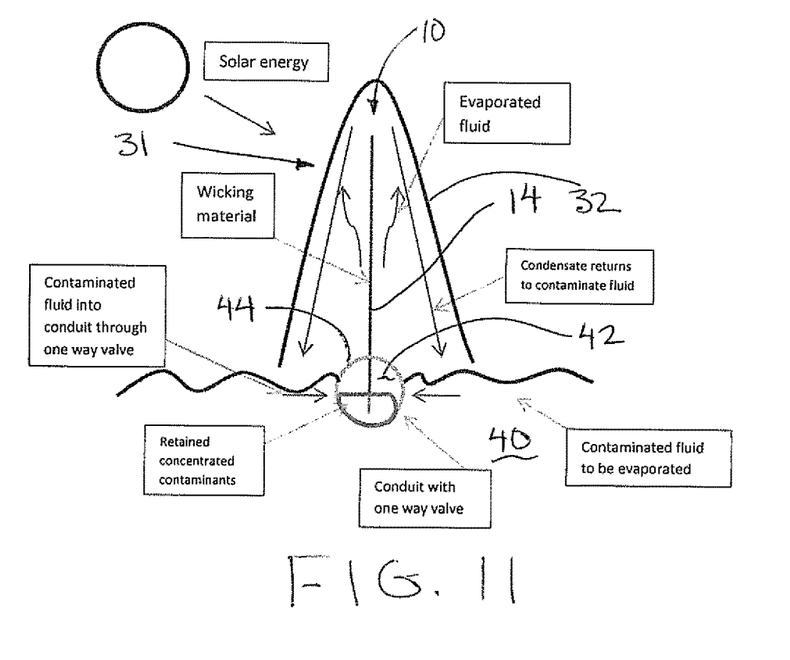
FIG. 11 is an end elevational view of a further embodiment of the condenser enclosure.

Turning now more particularly to the embodiment of FIG. 11, the evaporating portion of the wicking member is again surrounded by a condenser enclosure 31. The enclosure is defined by a similar transparent cover having an inner surface upon which the liquid portion evaporated from the wicking member is condensed. The bottom edge of the cover member is again positioned close to the wetted material, but in this instance the condensate is arranged to return to the wetted material. The embodiment of FIG. 11 further differs from the previous embodiment in that the pond or container locating the wetted material therein is divided into a first containment area 40 and a second containment area 42 separated from the first containment area by a suitable barrier 44. The barrier 44 prevents communication between the first and second containment area with the exception of a passage controlled with a suitable valve or gate arrangement to ensure that wetted material is only permitted to flow from the first containment area to the second containment area but the reverse flow is prevented. The contacting portion of the wicking member communicates only with the wetted material in the second containment area. Meanwhile the condensate from the condenser enclosure is only returned to the first containment area. Accordingly when the wetted material comprises a second portion, other than the liquid portion such as a solid portion or other contaminant in fluid suspension or in solution with the liquid portion, the second portion flows with the liquid portion from the first containment area to the second containment area, but remains in the second containment area as the liquid portion is evaporated by the wicking member and returned to the first containment area by the condenser enclosure. The purpose of this modification is to "cleanse" the fluid to be evaporated. The condensed fluid returns to the contaminated fluid pool defining the first containment area, diluting it, and the contaminates are retained in a conduit with a one way valve defining the second containment area. Before the fluid comes in contact with the wicking material, it must flow through a one way valve into the collection conduit. The evaporated fluid condenses on the transparent material as in the embodiment of FIG. 10, however it will be returned to the fluid body to be evaporated.

Figure 12:
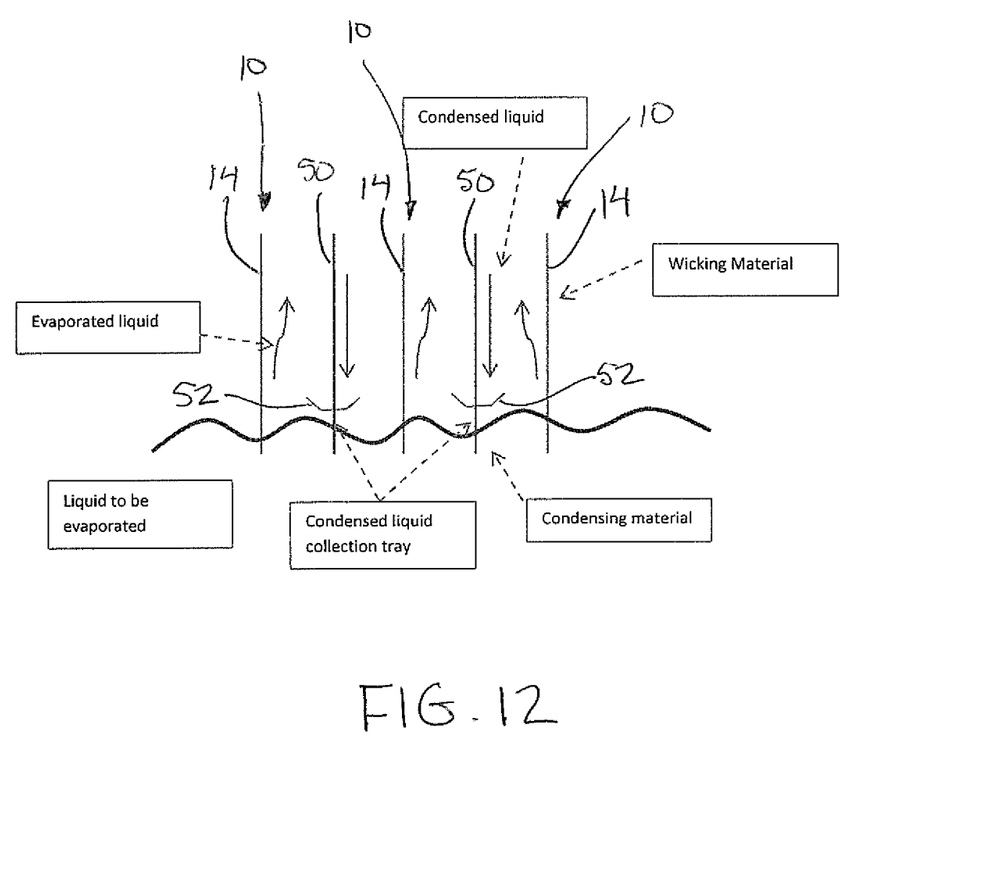
FIG. 12 is an end elevational view of another embodiment of the wicking member including a condenser member for collecting some of the liquid portion evaporated from the wicking member.

Turning now more particularly to the embodiment of FIG. 12, the wicking member 10 again comprises a panel of wicking material as in previous embodiments. The panels in this instance are supported parallel to one another at spaced apart positions in respective upright orientations such that each panel extends upwardly from the respective contacting portion in contact with the wetted material to the respective evaporating portion above the wetted material. As in previous embodiments the liquid portion is arranged to be transferred from the wetted material by wicking upwardly through the wicking member to the evaporating portion for evaporation therefrom. A suitable support frame supports the panels about their perimeter edges so that the spaced between the panels is unobstructed to air flow across the panels.

In this embodiment, a plurality of condenser members 50 are located at intermediate location between respective ones of the wicking members. Each condenser member comprises an upright panel positioned parallel and centered between the respective pair of wicking members on either side. The two opposing sides of each wicking member define respective surfaces upon which the liquid portion evaporated from the wicking members is arranged to be condensed. A trough structure 52 supported along the bottom of the condenser member adjacent to the upper surface of the wetted material collects condensate which drips down along the sides of the condenser member for use as may be desired. This allows a portion of the evaporated liquid to be collected, and also lowers the humidity in the area surrounding the wicking members, thus increasing the rate of evaporation from the wicking members. The surfaces of the condenser member can be arranged to be colder than the surrounding environment by communicating heat away from the condenser member. The cooling can be accomplished by partially submerging a bottom end of the condenser member in the fluid to be evaporated so as to transfer heat to the wetted material. Alternatively the cooling can be accomplished by mechanical means by transferring heat to an external cooling device operating as a refrigeration cycle, or heat transfer with cyclic overnight temperature drops.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method of dewatering a wetted material comprising at least a liquid portion, the method comprising:
    providing a wicking member comprising a wicking material having wicking properties so as to be arranged to transfer moisture passively by wicking therethrough from a contacting portion to an evaporating portion and conductive elements integrally supported on the wicking material so as to be arranged to conduct and transfer heat across the wicking member;
    positioning the wicking member with the contacting portion in contact with the wetted material and the evaporating portion supported externally of the wetted material such that:
        the liquid portion is arranged to be transferred from the wetted material primarily by wicking upwardly through the wicking member; and
        the transferred liquid portion is arranged to be evaporated from the evaporating portion; and
    exposing a portion of the conductive elements to a source of heat and passively conducting heat from the source of heat along the conductive elements across the wicking member.

2. The method according to claim 1 including penetrating the contacting portion of the wicking member downwardly into the wetted material.

3. The method according to claim 1 including arranging the evaporating portion of the wicking member to protrude substantially vertically upward from the wetted material.

4. The method according to claim 1 including transferring the liquid portion from the wetted material solely by passive wicking upwardly through the wicking member.

5. The method according to claim 1 including positioning the wicking member in contact with the wetted material such that moisture is transferred through the wicking member primarily by passive capillary action.

6. The method according to claim 1 wherein the wicking member comprises a textile.

7. The method according to claim 1 including dewatering a prescribed batch of wetted material by supporting the wicking member in a substantially fixed relationship with the wetted material.

8. The method according to claim 1 including dewatering a continuous flow of wetted material in a conduit by supporting at least a portion of the wicking member in the conduit.

9. The method according to claim 1 including supporting the evaporating portion of the wicking member to extend upwardly from the contacting portion to an upper free end of the wicking member.

10. The method according to claim 1 including supporting the wicking member to extend horizontally across wetted material between two opposing ends of the wicking member which are connected to a support frame.

11. The method according to claim 1 wherein the wicking member comprises a textile and the conductive elements of the wicking member are woven into the textile.

12. The method according to claim 1 wherein the conductive elements form a support structure which integrally supports the wicking material thereon.

13. The method according to claim 1 wherein the source of heat comprises solar rays.

14. The method according to claim 1 including connecting an electrical current source to the conductive elements such that the conductive elements are heated by an electrical current from the electrical current source.

15. The method according to claim 1 including supporting the wicking member to extend across an upper surface of a containment pond of the wetted material such that the wicking material is in direct contact with wetted material in the containment pond.

16. The method according to claim 1 wherein the wetted material comprises a salt solution.

17. The method according to claim 1 wherein the wetted material comprises flooded ground and the method includes laying the wicking member across a surface of the ground.

18. The method according to claim 1 wherein the source of heat comprises a waste heat arranged to heat conductive elements of the wicking material.

19. The method according to claim 1 in combination with a mechanical aeration device arranged to increase airflow across the wicking member.

20. The method according to claim 1 including providing a condenser enclosure about the evaporating portion of the wicking member which is arranged to condense and collect the liquid portion evaporated from the wicking member.

21. The method according to claim 20 wherein the condenser enclosure comprises a transparent member permitting solar rays to be transmitted therethrough to the evaporating portion of the wicking member.

22. The method according to claim 20 including providing a first containment area receiving the wetted material therein and a second containment area in communication with the first containment area such that the wetted material is only permitted to flow from the first containment area to the second containment area, positioning the contacting portion in contact with the second containment area, and returning the liquid portion collected by the condenser enclosure to the first containment area.

23. The method according to claim 1 further comprising:
providing a plurality of wicking members of like configuration, each comprising a panel;
supporting the panels at spaced apart positions from one another in respective upright orientations such that each panel extends upwardly from the respective contacting portion in contact with the wetted material to the evaporating portion above the wetted material;
providing at least one condenser member comprising at least one surface upon which the liquid portion evaporated from the wicking members is arranged to be condensed;
supporting said at least one condenser member at an intermediate location between respective ones of the wicking members; and
collecting the condensate which is condensed on said at least one condenser member.

24. The method according to claim 23 including cooling said at least one surface of said at least one condenser member by communicating heat from said at least one condenser member to the wetted material.

25. The method according to claim 23 including cooling said at least one surface of said at least one condenser member by communicating heat from said at least one condenser member to an external cooling device.

26. A method of dewatering a wetted material comprising at least a liquid portion, the method comprising:
providing a wicking member comprising a wicking material having wicking properties so as to be arranged to transfer moisture passively by wicking therethrough from a contacting portion to an evaporating portion;
providing a first containment area receiving the wetted material therein and a second containment area in communication with the first containment area such that the wetted material is only permitted to flow from the first containment area to the second containment area;
positioning the wicking member with the contacting portion in contact with the wetted material in the second containment area such that the liquid portion is arranged to be transferred from the wetted material by wicking through the wicking member to the evaporating portion for evaporation therefrom;
providing a condenser enclosure about the evaporating portion of the wicking member which is arranged to condense and collect the liquid portion evaporated from the wicking member; and
returning the liquid portion collected by the condenser enclosure to the first containment area.

27. The method according to claim 26 wherein the condenser enclosure comprises a transparent member permitting solar rays to be transmitted therethrough to the evaporating portion of the wicking member.

* * * * *